Apr. 10, 1923.
E. J. GULICK
1,451,040
STEERING ROD CONNECTION
Filed Nov. 30, 1917
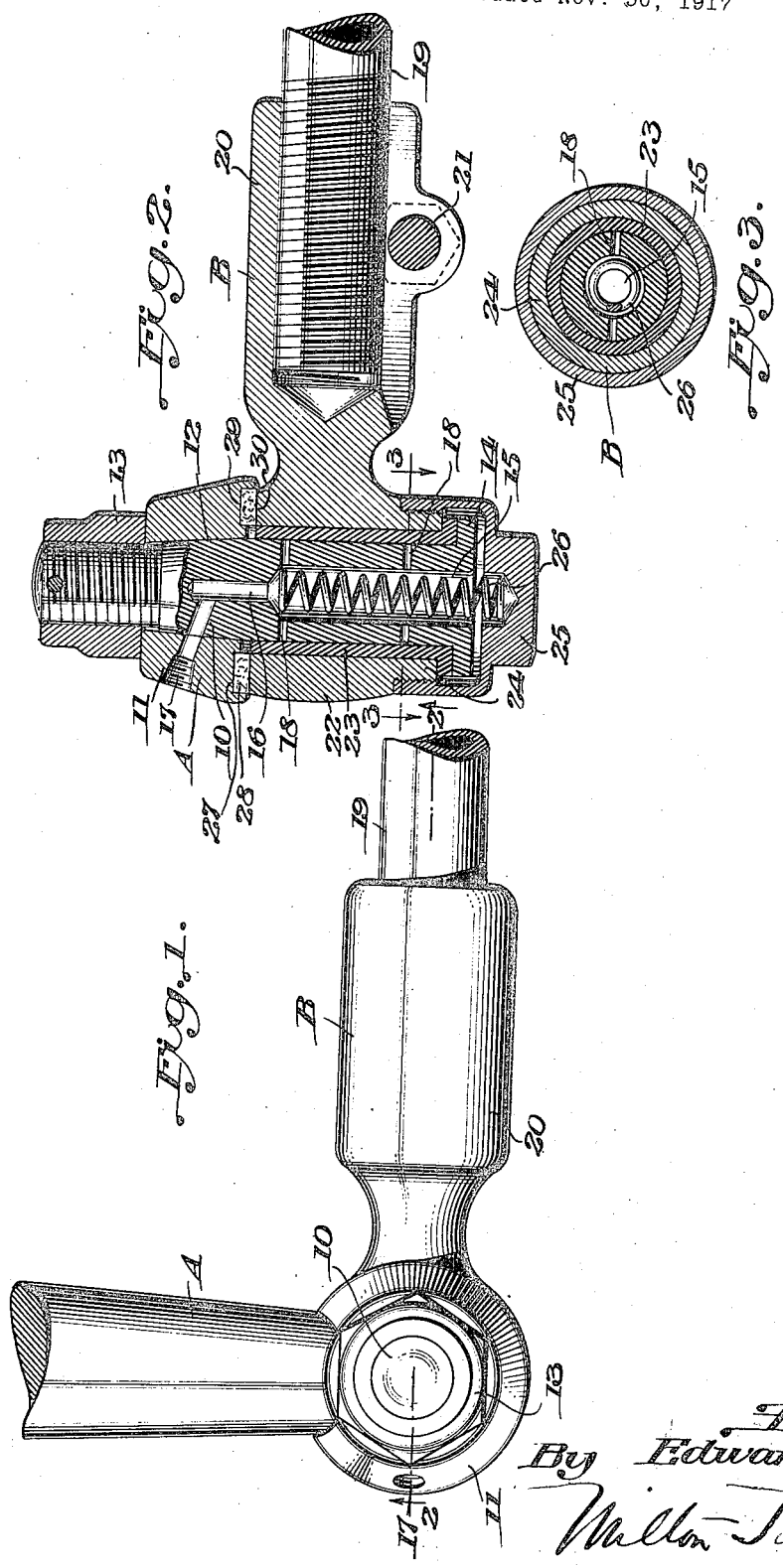
Inventor:
Edward J. Gulick,
By Millon J. Tibbetts,
Atty.

Patented Apr. 10, 1923.

1,451,040

UNITED STATES PATENT OFFICE.

EDWARD J. GULICK, OF ELKHART, INDIANA, ASSIGNOR TO PACKARD MOTOR CAR COMPANY, OF DETROIT, MICHIGAN, A CORPORATION OF MICHIGAN.

STEERING-ROD CONNECTION.

Application filed November 30, 1917. Serial No. 204,662.

*To all whom it may concern:*

Be it known that I, EDWARD J. GULICK, a citizen of the United States, and resident of Elkhart, Elkhart County, State of Indiana, have invented certain new and useful Improvements in Steering-Rod Connections, of which the following is a specification.

This invention relates to motor vehicles and particularly to steering connections therefor.

One of the objects of the present invention is to provide a steering connection with means for supplying lubricant thereto and retaining lubricant on the bearing surfaces. Another object of the invention is to provide a steering connection in which the bearing is between one of the members and a stud on the other member and the lubricant is fed to the bearing through the stud.

Another object of the invention is to provide a very strong and durable steering connection and one that is readily lubricated and which retains lubricant therein.

Other objects of the invention will appear from the following description taken in connection with the drawings which form a part of this specification, and in which:

Fig. 1 is a plan view of a motor vehicle steering connection embodying this invention;

Fig. 2 is a section on the line 2—2 of Fig. 1: and

Fig. 3 is a transverse section on the line 3—3 of Fig. 2.

Referring to the drawings A and B represent two steering members to be connected together for relative movement. The member A may represent one of the steering arms of a motor vehicle and the member B may be the steering cross tube or connecting rod.

One of the members, for instance the member A, has a stud 10 connected to it and as shown this stud extends laterally from the enlarged end 11 of the member A and it is fastened in the member by a tapered joint 12 and a nut 13.

From the base or tapered part of the stud 10 outwardly it is of cylindrical form and provided with a head 14. Also, the stud is hollowed or drilled out as at 15 to form a cavity for lubricant and a conduit 16 leads from the base of the cavity 15 through the tapered part of the stud 10 and through the enlarged end 11 of the member A to the outside thereof where it is threaded as at 17 so that a grease cup or grease gun may be attached thereto for supplying or feeding grease or other lubricant to the cavity 15. The stud also has transverse channels 18 extending from the cavity 15 to several points on the outer cylindrical surface of the stud, thus conveying lubricant from the interior of the stud to its outer surface.

The member B comprises a rod piece 19 and a socket piece 20 which are detachably secured together as by a bolt 21. The socket piece 20 has a part in the form of an eye 22 which surrounds the cylindrical part of the stud 10 between its head 14 and the member A. A bushing 23 is arranged between the eye 22 and the stud, thus forming a bearing between the stud and the member B.

The piece 20 above referred to has a boss 24 upon which a cap 25 may be threaded to thereby close the lower end of the opening through the eye 22 and surround the head 14 of the stud 10. This cap therefore completes the lubricant containing cavity formed by the hollowed-out part 15 of the stud 10 so the lubricant cannot escape at the head end of the stud.

For the purpose of retaining the eye 22, or its bushing 23, yieldingly against the head 14 of the stud a spring 26 is arranged in the cavity 15 and abuts at one end against the base of that cavity and at the other end against the cap 25. This arrangement also yieldingly separates the members A and B, the parts being so proportioned that a space 27 is left between them. For the purpose of preventing the escape of lubricant or the entrance of dirt through this space a packing ring 28 is provided to fill it. This ring rests against an annular seat 29 formed in the member A and against a plane surface 30 formed on the upper end of the eye 22 of the member B. It will be noticed that this packing ring, while it surrounds the stud 10, yet is separated from and independent of it.

It will be further understood that the connection may be supplied with lubricant through the conduit 16 and the cavity 15 and transverse conduits 18, either by arranging a grease cup in the threaded opening 17 or by inserting a grease gun and thereby filling the conduits and cavity.

It will be understood that my invention is not limited to the details of construction shown and other forms may be used without departing from the spirit or scope of the invention.

Having thus described my invention, what I claim and desire to secure by Letters Patent is:—

1. In a steering connection, in combination, a steering member, a laterally extending stud thereon, a second steering member having an eye surrounding and forming a bearing for said stud, said stud having means for distributing lubricant to said eye, a spring tending to separate the members, means limiting such separation, and packing between said members.

2. In a steering connection, in combination, a steering member, a laterally extending stud thereon, a second steering member having an eye surrounding and forming a bearing for said stud, means for distributing lubricant to said bearing, a spring tending to separate the members, means including a flange carried by said stud for engaging the eye and limiting such separation, and a packing ring surrounding said stud and arranged between said members.

3. In a steering connection, in combination, a steering member, a stud carried by said member and having a head, a second steering member having an eye surrounding and forming a bearing for the stud between its head and the other member, lubricant distributing means for said bearing, a spring tending to press the eye towards the head, and packing between said members.

4. In a steering connection, in combination, a steering member, a stud thereon having a head, a second steering member having an eye annularly surrounding the stud shank between its head and the other member, a cap over said head and threaded to said eye, and a spring between the stud and said cap.

5. In a steering connection, in combination, a steering member, a stud thereon having a head, said stud having lubricant distributing means, a second steering member having an eye surrounding the stud between its head and the other member, a cap over said head and secured to said eye, a spring between the stud and said cap, and packing between said members.

6. In a steering connection, in combination, a steering member, a stud thereon having a hollowed-out portion adapted to receive lubricant, a second steering member having a bearing on said stud, said stud having means for conducting lubricant to said bearing, a cap on said second member extending over the end of the stud, a spring in said stud in contact with said cap, and packing between said members.

7. In combination, a steering connection comprising a steering member, a laterally extending stud carried thereby and having a cylindrical shank, a second steering member having a cylindrical bearing portion surrounding the shank of said stud, said shank having a flange adapted to engage one end of the bearing portion of the second steering member, and resilient means for retaining the flange and bearing portion in engagement with each other.

In testimony whereof I affix my signature.

EDWARD J. GULICK.